Aug. 31, 1965  H. BRANDT  3,203,472
HEAT EXCHANGERS
Filed Nov. 22, 1963  2 Sheets-Sheet 1

INVENTOR.
HERBERT BRANDT
BY
ATTORNEY

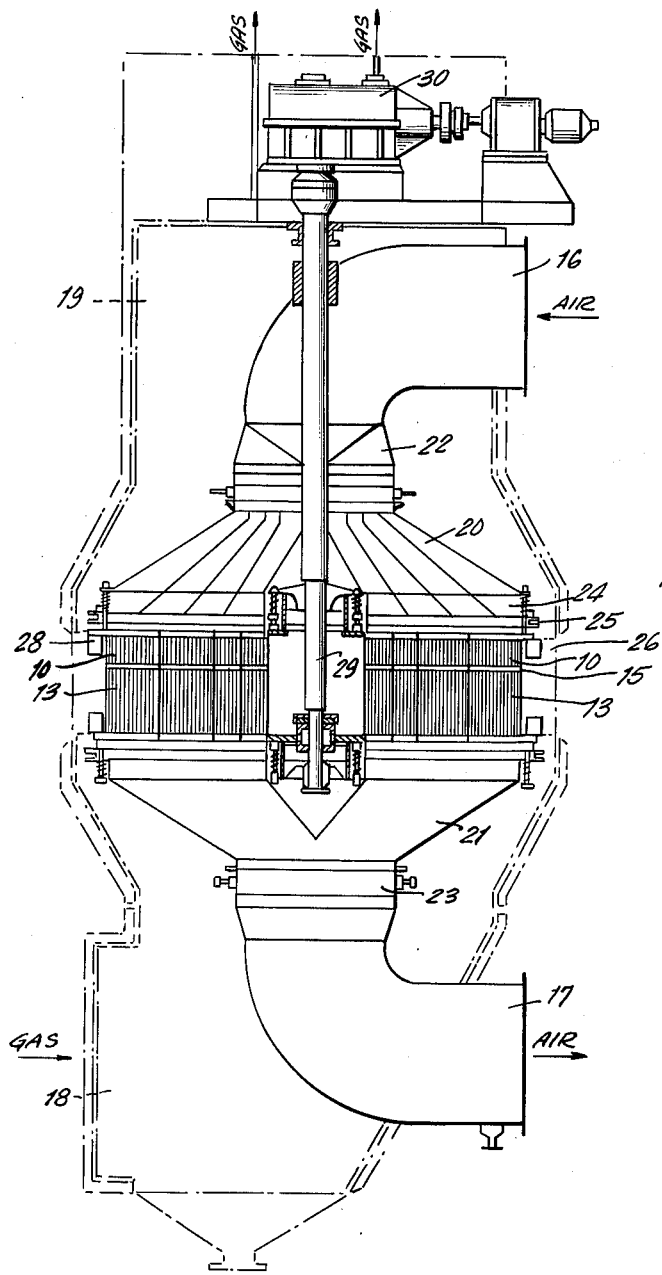
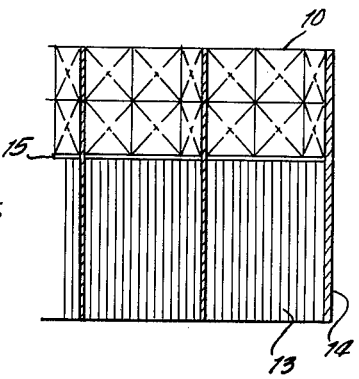
FIG. 5
FIG. 4

3,203,472
HEAT EXCHANGERS
Herbert Brandt, Rothemuhle uber Olpe, Vahlberg,
Westphalia, Germany
Filed Nov. 22, 1963, Ser. No. 325,585
9 Claims. (Cl. 165—10)

The present application is a continuation-in-part of my application Serial No. 80,169 filed January 3, 1961, and now abandoned.

The present invention relates to an improved heat storing and transferring mass suitable for use in regenerative heat exchangers.

The use of both a pack of metallic plates, which are closely spaced so as to provide gas flow passages, and ceramic blocks as a heat storing and transferring mass, is known.

It is evident that, from an efficiency point of view, it is desirable to have as large a temperature drop as possible over the ends of the heat exchanger. Thus it is that gases passing through a heat exchanger are often allowed to cool substantially below the dew point. Should the gases passing through the heat exchanger contain moisture, this moisture will condense in the zones of the heat exchanger where the temperature falls below the dew point so that moisture is deposited on the surfaces of the heat transfer mass. When ceramic blocks are used as the heat transfer material and the gases passing through the exchanger contain solid impurities such as soot, dust and the like, great difficulties arise if the specific surface of the ceramic blocks is relatively large and has a high humidity absorption characteristic. The condensed moisture covers the surface of the hollow blocks and the dust particles, soot or ashes adhere to the condensate and are thus deposited on the surface of the small gas passages. Within a relatively short period of time the flow of gas is materially impeded so that the laborious, tedious and time-consuming task of cleaning the heat exchanger must be undertaken fairly frequently. While this particular problem may be partially overcome by increasing the diameter of the flow passages of the ceramic blocks, this has the serious disadvantage that the specific surface of the blocks, which is already small in comparison with that of other filler material or metallic sheets, is further reduced.

A further problem arises in the use of heat exchangers for moisture containing gases at a temperature below the dew point as a result of the fact that these gases often also contain chemicals which, together with the condensed moisture, can cause very serious corrosion when metallic plates are used.

It is the object of the present invention to overcome the above-mentioned disadvantages and to provide a rotary regenerative heat exchanger which has a high packing density so as to provide efficient heat exchange and which is capable of operating at temperatures below the dew point even when carrying moisture and impurity laden with gases without clogging up or corroding.

The present invention thus provides a regenerative heat exchanger having an annular heat exchange drum mounted between headers and having relatively displaced inlet and outlet openings for a heating gas and a gas to be heated, which openings register with a different and limited cross sectional area of the heat exchange drum at any one time by relative rotation of the drum and the headers, said drum incorporating a heat storing and transferring mass having gas flow passages therein, said passages alternately communicating with said inlet and outlet openings during relative rotation of said drum and said headers and adapted to carry a moisture and impurity laden gas, one zone of said mass being subjected to temperatures above the dew point and a second zone, in axial alignment with said first zone, to temperatures below the dew point, the mass in said one zone comprising a plurality of closely spaced plate-like elements and the mass in said second zone comprising elements with the passages therein having smooth water and dust repellent surfaces.

The elements constituting the heat storing and transferring mass in the second zone, i.e. in the zone adapted to operate at temperatures below the dew point, preferably comprise ceramic blocks in which the passages have glazed water and dust repellent surfaces, said glazed surfaces preferably being baked into or on to the blocks.

For the purposes of heat exchanging efficiency, the passages in the ceramic blocks preferably have a flow radius of less than 1 centimeter.

In further, though not economically preferred embodiments of the invention, the heat storing and transferring mass of said second zone may comprise spaced members of metal or synthetic material having surfaces coated with a glazed silicone coating material to provide smooth water and dust repellent surfaces.

The smooth water and dust repellent surface may be obtained by applying a thin coating of a water repellent composition to the surface to be coated or by providing a glazed surface which may be burned on to or into the desired surface.

The water repellent coating on the surfaces of the ceramic blocks may consist of a silicone material. A coating of silicone may be applied to the surfaces of the ceramic blocks by dipping the blocks into an aqueous silicone emulsion and then heating the blocks to approximately 300° C. so as to harden the silicone.

The provision of the water repellent surfaces on filler materials, which are made of substances which may be provided in the form of thin walls so as to allow an increase of the packing density, represents an additional improvement according to the invention. For this purpose, hollowed bodies or dense packings of metallic, non-metallic or synthetic materials such as sintered powders and silicones may be used, or the filler materials themselves may be manufactured of artificially produced materials such as the "Silicone-Caoutchouc" produced by Wacker, "Delanium" produced by Powell Duffryn of Great Britain or "Carbate" produced by National Carbon Company. Silicon-caoutchouc is a polymeric silicon-oxygen compound having organic groups R at each silicon atom and is spatially a lattice-like rubbery polymer obtained by vulcanization and representable as follows:

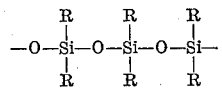

As the temperature in a certain section—the "hot" section—of the heat exchanger never falls below the dew point, there will be no danger of clogging or corrosion due to condensation in this section. The length of the "hot" section of the heat exchanger may be calculated from the fuel and the firing relationships and the inlet and outlet temperatures of the gases. It is obviously not necessary to use heat storing and transferring material which is coated with a smooth water and dust repellent surface in this section and it is in fact desirable to use the normal packing of thin sheet metal plates under these conditions as not only can a higher packing density be obtained with this material than with ceramic hollow blocks but the cost of production is also less.

While the exact ratio of the material comprising blocks covered with a water and dust repellent surface to the material comprising the conventional sheet metal plates must be calculated for each particular case, it has been found that the material of the former type will generally occupy about one quarter of the total packing height while the material of the latter type generally occupies about three quarters of the total packing height.

In the case of a heater constructed in accordance with the invention, the operating and installation costs may be held to a minimum being lower than in the case of a heat exchanger which is constructed entirely with the conventional sheet metal plates (the sheet metal plates would then have to be thicker so as to compensate for corrosion in the "cold" section of the exchanger) than in the case of a heat exchanger constructed only with ceramic hollow blocks.

The invention and the manner in which it may be put into practice is described below with reference to the accompanying drawings in which:

FIGURE 4 is a diagrammatic view showing the metal and ceramic elements and their arrangement in a regenerative heat exchanger; and FIG. 5 shows in vertical cross-section the construction of a typical regenerative heat exchanger embodying the invention.

Figure 1:
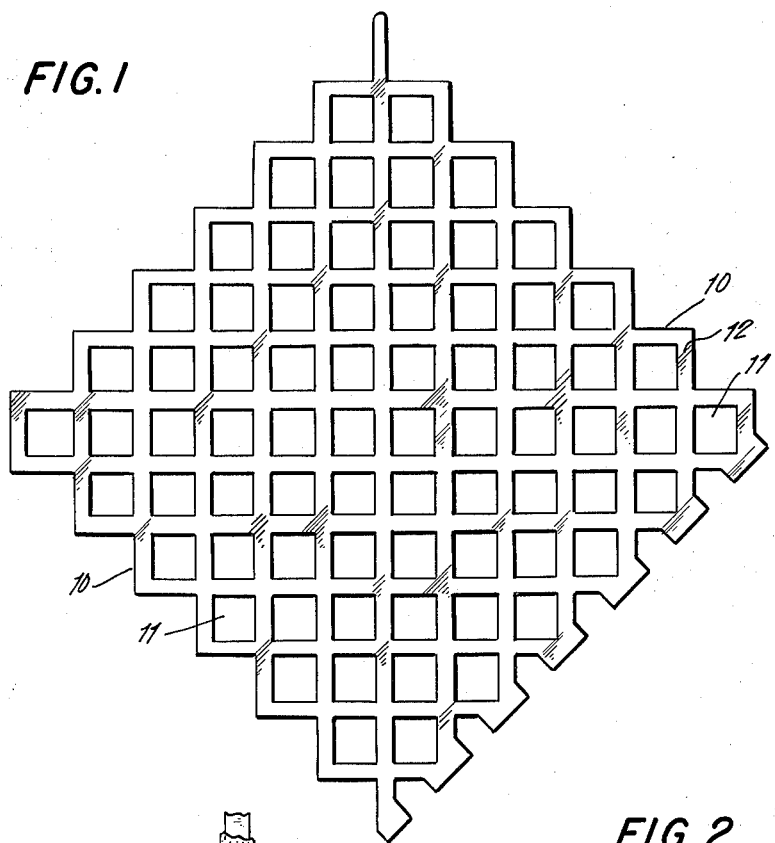
FIGURE 1 is a plan view of a ceramic block made up of a grid-like body with fluid passages therethrough and provided with water-repellent surfaces.
Figure 2:
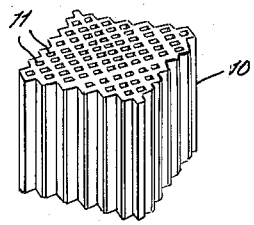
FIGURE 2 is a perspective view of the hollow ceramic block of FIGURE 1.
Figure 3:
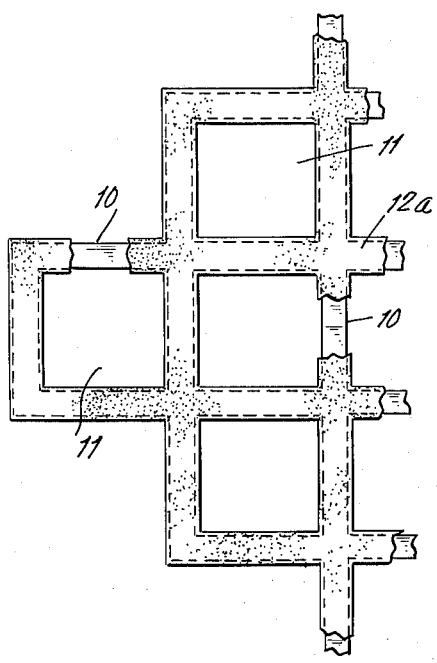
FIGURE 3 is a fragmentary detail of a ceramic block on an enlarged scale showing the use of a water-repellent coating.

In FIGURE 1 there is shown a hollow block having a grid-like body 10 with passages 11 extending therethrough for the circulation of hot waste gases or for gases or air to be heated. The passages 11 are preferably formed by an extrusion process and are so located in the support structure of an air heater or regenerator that the passages 11 are oriented in the same general direction as the gas flow. The hollow block 10 is provided with a water and dust repellent surface designated at 12 which may be a glaze or other smooth impervious surface or which, as shown in FIGURE 3, may be a coating of a suitable material such as silicone or in particular the material known as "Silicon-Caoutchouc" (Wacker) as shown at 12a and which is applied as by dipping the hollow block into an an aqueous emulsion or suspension of the "Silicon-Caoutchouc" followed by heating or baking at 300° C.

The heating surfaces of the regenerator or heat exchanger are formed of these hollow blocks which are stacked one on top of another and which blocks preferably have a height not in excess of 10 centimeters. The passages preferably have a hydraulic radius not in excess of one centimeter and the stacking arrangement can provide variations in the gas flow to cause a turbulence tending to improve the heat transfer properties of the gas stream. The heating surfaces may also be arranged as several adjacent units wherein the blocks of each unit are supported by the supporting structure of the heat exchanger or regenerator. Good engineering practice dictates that the ceramic blocks constitute about one-fourth of the total packing height of which the remaining three-fourths is constituted of the usual thin sheet metal packings.

FIGURE 4 illustrates in part the arrangement and relationship of the upper ceramic blocks 10 and the lower metallic elements 13 within the casing or housing 14 and the disposition of the ceramic and metallic elements in a regenerator or regenerative preheater is shown in FIGURE 5, it being noted from both FIGURES 4 and 5 that there is a horizontal separation at 15 between the upper ceramic elements and the lower metallic elements.

Referring further to FIGURE 5, air enters the stationary air inlet duct 16 and exits via air outlet duct 17, whereas gas enters the gas inlet duct 18 and exits via the gas outlet duct 19. The numerals 20 and 21, respectively, indicate upper and lower rotating air hoods connected by spring loaded air inlet collar seals 22 and 23 and air hood sealing means is provided at 24, there being an expansion joint 25 subjacent thereto. The numeral 26 indicates a heating element cylinder surrounding the upper ceramic and lower metallic elements 10 and 13 whereby the required heating is provided. For easy turning, seal plate positioning rollers 28 are provided. The shaft 29 acts as an air hood support and also as a drive shaft actuated from the prime mover 30 which may, for example, be a driving unit with reduction gearing and thrust bearings. Since the regenerator or regenerative preheater structure of FIGURE 5 is per se known and does not itself constitute a part of the present invention, it is shown for environmental purposes primarily as a typical device in which the ceramic and metallic surfaces are disposed in a stator while only the air hoods and their sealing devices rotate.

The metallic elements 13 are made up usually of thin sheet metal which may be planar or corrugated or a combination thereof and are disposed in a special radial arrangement. The metallic elements are disposed in the vicinity of the "hot" end of the regenerator system, whereas the ceramic elements are disposed in the vicinity of the "cold" end of that system. In particular the metallic elements are so situated that they are subjected to temperatures above the dew point and the ceramic blocks or elements are so located that they are subjected only to temperatures below the dew point. It has been found to be extremely important to provide the ceramic blocks or elements with the water and dust repellent surface preferably obtained by coating the surfaces with a smooth repellent silicone coating material as otherwise the benefits of the invention cannot be obtained.

What is claimed is:

1. In a regenerative heat exchanger having an annular heat exchange drum mounted between headers and having relatively displaced inlet and outlet openings for a heating gas and a gas to be heated, which openings register with a different and limited cross sectional area of the heat exchange drum at any one time by relative rotation of the drum and the headers, said drum incorporating a heat storing and transferring mass having gas flow passages therein, said passages alternately communicating with said inlet and outlet openings during rotation of said drum and adapted to carry a moisture and impurity laden gas, the gas entry zone of said mass being subjected to temperatures above the dew point of the heating gas and the gas exit zone, in axial alignment with said gas entry zone being subjected to temperatures below the dew point of the heating gas, the mass in said gas entry zone comprising a plurality of closely spaced plate-like elements, the improvement wherein the mass in said gas exit zone comprising elements with passages therein having smooth surfaces provided with a water- and dust-repellent coating.

2. The improvement as defined in claim 1, in which the mass in said gas exit zone comprises ceramic blocks with passages therein having glazed water- and dust-repellent coating.

3. The improvement as defined in claim 2, in which said coating comprises a glazed coating baked into the block.

4. The improvement as defined in claim 2, in which said coating comprises a glazed silicone coating material.

5. The improvement as defined in claim 2, in which said passages have a flow radius of less than 1 centimeter.

6. The improvement as defined in claim 1, in which the mass in said gas exit zone comprises spaced metallic members having surfaces coated with a glazed silicone coating material to provide smooth water- and dust-repellent surfaces.

7. The improvement as defined in claim 1, in which the mass in said gas exit zone comprises spaced members of synthetic material having surfaces coated with a glazed silicone coating material to provide smooth water- and dust-repellent surfaces.

8. In a regenerative heat exchanger having an annular heat exchange drum mounted between headers and having relatively displaced inlet and outlet openings for a heating gas and a gas to be heated, which openings register with a different and limited cross sectional area of the heat exchange drum at any one time by relative rotation of the drum and the headers, the improvement which comprises a heat storing and transferring mass comprising thin metal sheets in the hot section of the heat exchanger in communication with ceramic blocks with a multiplicity of passages therethrough having smooth surfaces provided with a water-repellent glazed coating in the cold section of the heat exchanger.

9. In a regenerative heat exchanger having an annular heat exchange drum mounted between headers and having relatively displaced inlet and outlet openings for the heating gas and a gas to be heated, which openings register with a different and limited cross sectional area of the heat exchange drum at any one time by relative rotation of the drum and the headers, the improvement comprising a heat storing and transferring mass having a multiplicity of passages therethrough comprising one-third thin metal sheets in the hot section of the heat exchanger and two-thirds ceramic blocks having smooth surfaces provided with a water-repellent glazed coating consisting of a silicon hardened by heat treatment at 300° C. in the cold section of the heat exchanger.

References Cited by the Examiner

UNITED STATES PATENTS 2,588,828  3/52  Greiner.
2,726,176  12/55  Hatcher et al.

FOREIGN PATENTS 1,231,530  4/60  France.
910,711  5/54  Germany.

ROBERT A. O'LEARY, *Primary Examiner.*

CHARLES SUKALO, *Examiner.*